US008881984B2

(12) United States Patent
Santos et al.

(10) Patent No.: US 8,881,984 B2
(45) Date of Patent: Nov. 11, 2014

(54) SYSTEM AND AUTOMATIC METHOD FOR CAPTURE, READING AND DECODING BARCODE IMAGES FOR PORTABLE DEVICES HAVING DIGITAL CAMERAS

(75) Inventors: Eduardo Telmo Fonseca Santos, Salvador (BR); Eduardo Manuel De Freitas Jorge, Salvador (BR); Talmai Brandão De Oliveira, Cincinnati, OH (US); Alberto Almeida De Azevedo Filho, Lauro de Freitas (BR); Pedro Matos Motta, Salvador (BR); Silvio Guedes Santana, Plataforma (BR); Felipe Piñeiro Bitencourt, Salvador (BR); Roneclei Campos Dos Santos, Salvador (BR); Geovane Dos Santos Anunciação, Salvador (BR); Raul Cezar Costa De Abreu, Salvador (BR); Gustavo De Almeida Neves, Salvador (BR); Victor Franco Costa, Salvador (BR)

(73) Assignee: Samsung Electrônica da Amazônia Ltda., Manaus-Am (BR)

( * ) Notice: Subject to any disclaimer, the term of this patent is extended or adjusted under 35 U.S.C. 154(b) by 691 days.

(21) Appl. No.: 12/818,951

(22) Filed: Jun. 18, 2010

(65) Prior Publication Data

US 2011/0155808 A1   Jun. 30, 2011

(30) Foreign Application Priority Data

Dec. 31, 2009  (BR) .............................. 020090122269

(51) Int. Cl.
*G06K 7/10*   (2006.01)
*G06K 7/14*   (2006.01)

(52) U.S. Cl.
CPC ..................................... *G06K 7/146* (2013.01)
USPC ............................... 235/462.09; 235/462.12

(58) Field of Classification Search
USPC ........................................ 235/462.09–462.12
See application file for complete search history.

(56) References Cited

U.S. PATENT DOCUMENTS

| | | | | |
|---|---|---|---|---|
| 2005/0225648 A1* | 10/2005 | Lin et al. | ..................... | 348/222.1 |
| 2008/0105747 A1* | 5/2008 | Orlassino | ................. | 235/462.41 |
| 2009/0001165 A1* | 1/2009 | Zhang et al. | ............. | 235/462.11 |
| 2009/0212113 A1* | 8/2009 | Chiu et al. | ................ | 235/462.41 |
| 2012/0018518 A1* | 1/2012 | Strom et al. | ............. | 235/462.04 |

\* cited by examiner

*Primary Examiner* — Christle I Marshall

(57) ABSTRACT

A system for decoding barcodes, by having an integrated hardware and software solution for reading and decoding of barcode using portable devices that have a camera.

21 Claims, 6 Drawing Sheets

FIGURE 3

SYSTEM AND AUTOMATIC METHOD FOR CAPTURE, READING AND DECODING BARCODE IMAGES FOR PORTABLE DEVICES HAVING DIGITAL CAMERAS

CROSS-REFERENCE TO RELATED APPLICATIONS

This application is based upon and claims the priority benefit of Brazilian Patent Application No. 020090122269, filed on Dec. 31, 2009, the entire contents of which are incorporated herein by reference.

FIELD

The present invention relates to the field of human interaction with portable devices, in particular the interaction between the automatic recognition of barcode images captured through the camera integrated in portable devices, in particular mobile phones, smartphones, Personal Digital Assistants PDA, portable digital camera, among others.

BACKGROUND

For extracting the sequence of numbers represented by a barcode, it has been used techniques of image processing and computer vision implemented in a system for decoding barcode. The use of the image obtained with the camera of the portable device requires preprocessing to compensate for eventual problems and even corrections to map the photo originally captured to become a barcode image with no perspective nor rotation, i.e., a rectangular image pattern that is directly decodable.

Several types and standards of barcodes are available, each one with a specific purpose. Some examples are the EAN-13 standard used in commercial products and the Interleaved 2 of 5 Standard used in bank accounts and invoices.

Currently, the standard barcode commonly used to represent commercial products is the EAN-13, which usually represents the country code, the manufacturer code and the product code. Barcodes are present in various commercial means and represent a key item in the automation of control processes of sale and stock. The implementation of barcodes for stock control was so successful that in a short period of time, barcodes began appearing in other scenarios beyond the market: banks, industry, etc.

However, as the amount of information that a bill barcode and bank accounts is greater than the amount of information needed to represent a product, a new standard was developed to meet such specifications. At that moment, it came up the Interleaved 2 of 5 Standard that is able to represent a greater amount of information. In this pattern, it represented the type of account, the value and expiration date.

Barcodes are a graphical representation of a numeric or alphanumeric data set. Data stored in the codes are arranged in a composite image, usually by dark and light bars interleaved. These bars represent information that clearly identify products or services and standardize the way such information is expressed, which evidences the automation process of reading of such information.

The information contained in the barcode is decoded by a barcode reader, which sweeps the image to identify the information represented on the same.

Systems for reading barcodes are often based on optical scanning performed by a device, which consists of a laser device that performs a scan on the image and passes the obtained values to a software. However, this device is not portable.

Barcode reading via infrared is made by a chain of sensors aligned disposed in the head of the reader. These aligned sensors are responsible for reading the barcode, which occurs as follows: each sensor is responsible for measuring the light intensity immediately in front of the same. Thus, through the reflection of energy, the reader indicates one voltage standard that matches the color variation captured by the sensors, enabling the decoding of the numbers represented in the barcode. Infrared reading is one-dimensional because it is performed in a specific line of code only, which increases the error rate if there is noise in the image.

The Brazilian patent document PI 0603273-7, published on Jan. 25, 2008, describes a system and method that uses a software to perform the decoding of barcodes directly to mobile devices equipped with digital cameras. This document describes a method of preprocessing image captured by the device camera to verify the presence of a barcode. This method comprises converting the image into two colors, and then you perform a scan process of the image that aims to convert the same in two colored states. After this procedure is performed, it is carried out the filtering of the information contained in the image. Below, there is provided a parameter to identify the component parts of the image. Then, the component parts are checked to find whether or not a barcode. If the verification is positive, the value represented in the barcode is obtained. The steps taken by the process described in the Brazilian document PI 0603273-7 are not detailed enough. The document PI 0603273-7 presents the state of the art, not adding new elements and does not explain how to solve the problems despite indicating them.

The document U.S. Pat. No. 7,156,311 issued Jan. 2, 2007, describes a system and method for decoding and analyzing barcodes using a mobile device. The barcode information is transmitted to a server using a wireless network and a media content related to barcode is transmitted back to the mobile device. Tilt and rotation corrections are mentioned, as well as aspects related to lighting and focus. Although the US document details the process of identification of the bars, it does not mention the obtainment of efficient process to correct rotation and perspective distortions, in particular taking into account the procedure is repeated until it is obtained a valid decoding.

Bato ("Barcode Toolkit"), http://people.inf.ethz.ch/adelmanr/batoo/index.php/Documentation/Algorithm, ETH Zurich, of 2007, uses multiple scan lines ("scanlines") to increase the robustness of the process, but it does not use information stacking in each slice to improve signal to noise ratio. It also uses a validation process between multiple scan lines, but it does not use a process of cross validation between multiple stacked cutouts, which is much more robust. The technique used in this document has limitations in respect to barcodes partially crushed or in perspective.

The document "The superresolution approach for barcode reading" by Rusen and Levent Oktem Oktem, 2005, uses a super-resolution method to extract the geometric features of the quadrangles that make up a barcode. Each barcode is a quadrilateral that has width and angle to be estimated. An algorithm for solving non-linear system of equations (Newton-Raphson) is used. This implies a longer processing time, which prevents practical solutions given the processing limitations of portable devices.

The document "Barcode Readers using the Device camera in Mobile Phones" by Eisaku Ohbuchi et al., 2004, presents algorithms and implementations for the reorganization of images of EAN/QR barcodes, using a digital signal processor (DSP) for perform the decoding of barcodes in real time. The described method uses homogeneous coordinates, which implies in a large computational cost, in particular considering that a portable device would not necessarily be equipped with a DSP. There are also mentioned problems due to the threshold between light and dark regions.

The paper "Robust Software Barcode Reader Using the Hough Transform" by Rubén Muñiz et al., November 2009, presents a method based on Hough transform for decoding barcodes. The image containing the lines of a barcode is mapped into another space parameterization in order to increase the robustness of the decoding of barcode in Code 39 and EAN-13 patterns. There is no mention to previous procedures to correct lighting and no considerations are made about how to optimize the processing time, which would be indispensable if it was aimed to implement the described method in a portable device.

The document "Camera-based barcode recognition system using neural net," by Shu-Jen Liu et al., October 1993, describes a method for decoding barcodes using neural networks. There are mentioned possible problems with the texture of the document that may interfere with the identification of the rectangle containing the barcode.

The document "A Two-Dimensional Barcode Reader" by N. Normand, C. Viard-Gaudin, October 1994, presents a method based on the second derivative to detect the transitions between bars and also to minimize error by the method of least squares. The resulting method requires the use of a workstation due to the high computational cost, which makes its direct application impractical for portable devices.

The above described methods have the ability to decode barcodes in situations closer to the ideal situation or require computational cost incompatible with portable devices. However, they have limitations when it comes to the specific and qualitative treatment executed before the decoding process in order to increase efficiency and effectiveness of the application. The solution described in this invention offers some advantages that aim to increase the robustness of the application offering specific treatment for everyday situations, such as poor lighting, shading, perspective correction, movement detection, automatic detection of the barcode and correction of noise found in the image.

Thus, according to the elements introduced by the present invention, there is provided a method to not only recognize and decode a barcode without the need for deployment of new sensors, but also treat some adverse situations commonly found in barcode images. The method of perspective correction, for example, corrects images captured with tilt angle and perspective. Thus, the remaining operations can be performed with reference to an image without tilting, which reduces the complexity of processing for other processes and increases the success of the application.

SUMMARY

The present invention provides a system for decoding barcodes, by means of an integrated hardware and software solution for reading and decoding of barcode using portable devices that have a camera.

This solution allows its user to use a portable device to automatically take a photo of the barcode contained in a document, perform image processing, decoding the number represented by the barcode and validate the same at least ten times faster that decoding in an ATM, which represents a significant gain over the time spent by the user. Besides, the barcode decoding system itself embedded in the portable device is in charge of checking if the decoding is valid. The barcode is divided into several horizontal slices, the slices being decoded and compared with each other, so that only when there is coherence between the multiple detections, the process is deemed validated, ensuring its robustness.

Thus, the system described herein serves as a portable decoder, reliable, efficient and robust for barcode recorded, for example, in physical means such as bills or virtual means, as in a computer screen. The user can also use the system described herein to send information directly to make payment directly to the institution responsible for the payment transaction.

The system presented herein decodes barcodes printed on the 2 of 5 interleaved Standard, using a portable device to capture images and perform barcode decoding. This system allows you to view and/or send the numbers decoded to a bank web page ("home banking"). This system was developed in order to automate the process of entering the numerical values represented in a standard 2 of 5 Interleaved barcode, avoiding the effort to read and type the numeric values corresponding to the values represented in specified barcode.

Some barcodes does not have the necessary quality for decoding (problems such as old images, wrinkled, noisy, poor print quality, low contrast between light and dark bars, poor lighting, perspective, etc. are common situations related to decoding barcodes). Another common problem, which impacts negatively on the decoding process is the quality of the image captured by the device camera. Images can be captured blurred, or the device camera cannot provide images with sufficient quality to be decoded. Therefore, to reduce decoding errors arising from the aforementioned problems, thereby increasing the effectiveness of the application, the system presented herein has algorithms that help to correct possible deficiencies commonly found in barcode images.

BRIEF DESCRIPTION OF THE DRAWINGS

The objectives and advantages of the present invention will become more apparent from the following detailed description of an example of implementing the invention and attached drawings by way of non-limiting example, in which:

FIG. 2 illustrates how a typical user will use the invention.

DETAILED DESCRIPTION OF EMBODIMENTS

Figure 1:
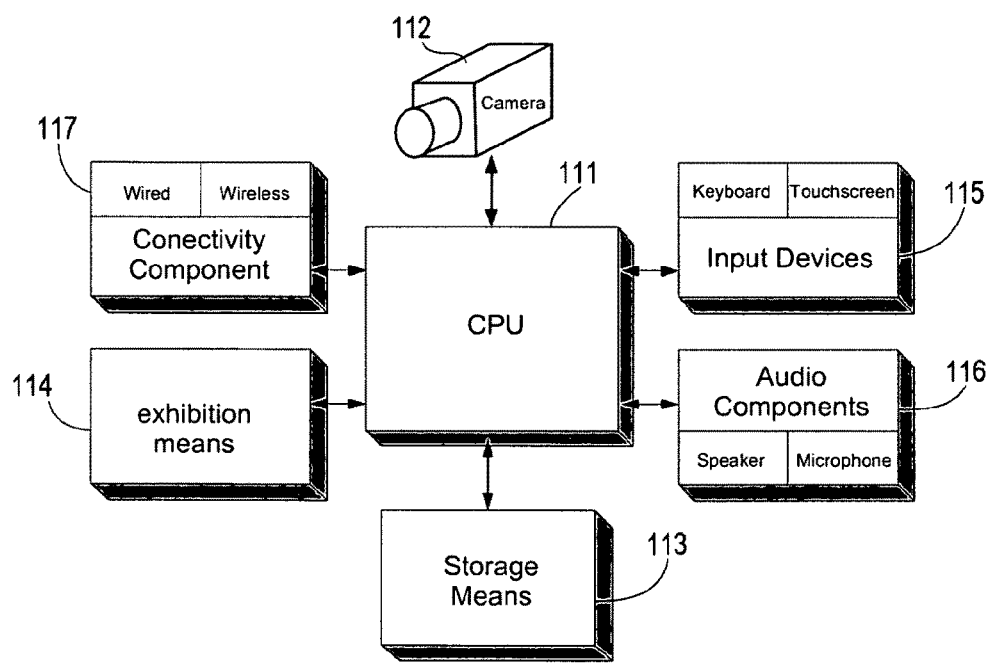
FIG. 1 shows a generic example of a portable device, wherein the system can be implemented.
Figure 2A:
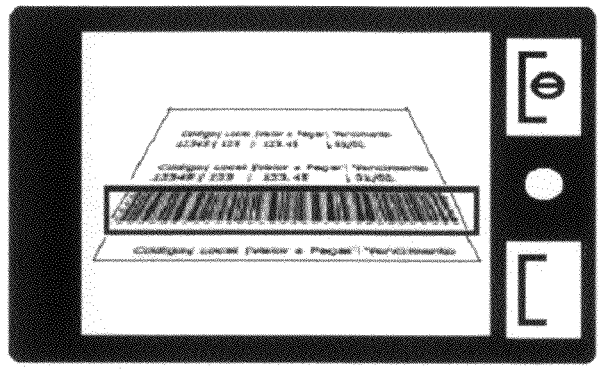
FIG. 2a shows an example of initial screen of the system presented in a portable device.
Figure 2B:
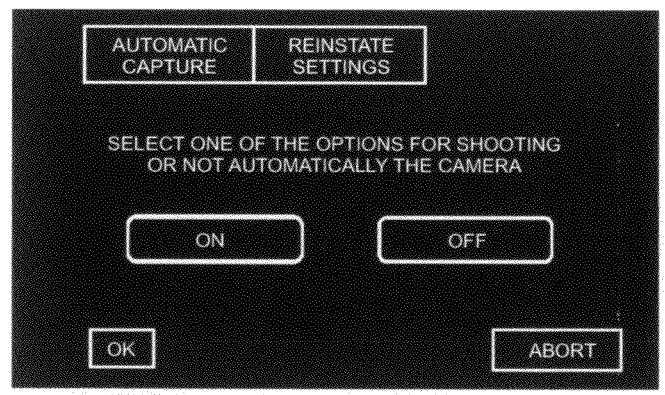
FIG. 2b shows an example setup screen for manual or automatic capture of images.
Figure 2C:
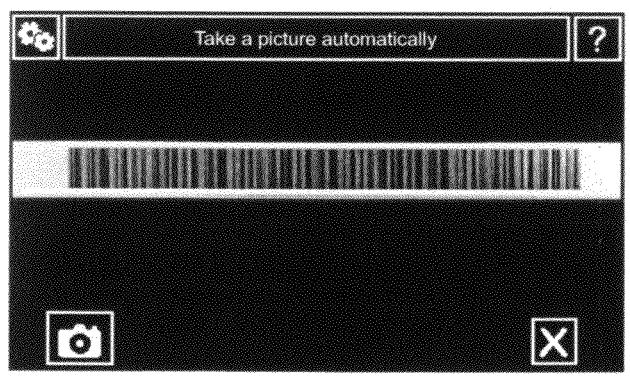
FIG. 2c shows a sample screen capture of an image of an interleaved 2 of 5 barcode.

The system described in FIG. 1 has the ability to identify barcodes automatically or manually, depending on a previous setting made by its users, as shown in FIG. 2a. With the option of automatic capture off (FIG. 2b), the user must position the barcode using the camera of the portable device manually take a picture on the portable device, as shown in FIG. 2c.

With the option of automatic photo selected, the system checks, from time to time, if there is a barcode corresponding to the area centered on the camera. Once a possible barcode has been identified, the system capture and starts the decoding process.

The operation of the decoding of barcode is based on analysis of photographs. Once a photo is captured, the system validates, decodes and checks the image in question, showing the result. The portable device displays dynamic and intuitive messages that support usability.

The quality of the printed barcode is an essential factor for a successful decoding. However, it is possible to find barcodes that do not have the expected quality for the decoding process. To reduce this problem, the system proposed by the present invention divides the image and consider the limit of each cropped section generating a new image with printing errors corrected. Thereafter, the optimum results on all the sections are compared and assessed the veracity of both is aimed to achieve a common output. Thus, images with poor print quality, wrinkled, blurred, or having any problem in the contrast between dark and light bars, are corrected allowing them to be successfully decoded.

The quality of the captured photograph is also of great impact on the decoding process. Several factors can cause loss of quality in the captured image: resolution of the device camera, illumination of the environment in which the image is captured, perspective, improper moving of the device during image capture can result in a blurred image, etc. The system presented herein help to solve these problems. Images captured with tilt and perspective are corrected by the application through the perspective correction, before being decoded. Problems related to lighting are also treated through the adjustment of contrast thresholds in accordance with the lighting of the environment in which the image is captured. In devices having motion sensors, the application is also able to verify that the device was moved while the image is being captured, delaying the capture of the image, avoiding a blurred image is captured.

Some cameras offer some devices for brightness correction features such as flash, for example. However, the images captured by the system described herein are usually captured near the source and correction resources such as brightness correction imply in unwanted brightness in the picture. In order to avoid this problem, the application does not use such resources for brightness adjustment, which increases the homogeneity of the contrast between dark and light colors of the captured images, thereby increasing the chances of successful decoding.

Technical/Functional Advantages of the Invention

Low Computational Cost

Depending on the optimizations made in the steps of barcode detection and recognition, the system proposed by this invention can be implemented without degrading the performance of the appearance rate of the preview frames of the device.

Robustness in the Reading of the Code

Such robustness is achieved using the following techniques in conjunction:

Cross-Validation of intermediate results;
Perspective correction of the image;
Automatic adaptation to ambient lighting;
Confirmation of the final result through the check digit, and
Correction of image noise.

Cross Validation of Intermediate Results:

The system, after the capture of an image, divides it and performs parallel tests in each of these sections, in which it identifies blocks and in such blocks there is provided an image enhancement in grayscale. The decoding process is applied to the various sections and all results are checked later. The numbers are then validated one by one, section by section, and the results of each section are compared in order to determine whether the decoding of all the sections is valid.

After identifying the string of numbers represented in the barcode, the system performs a validation check digit, showing the results only if they are indeed correct.

Perspective Correction of the Image

Figure 6:
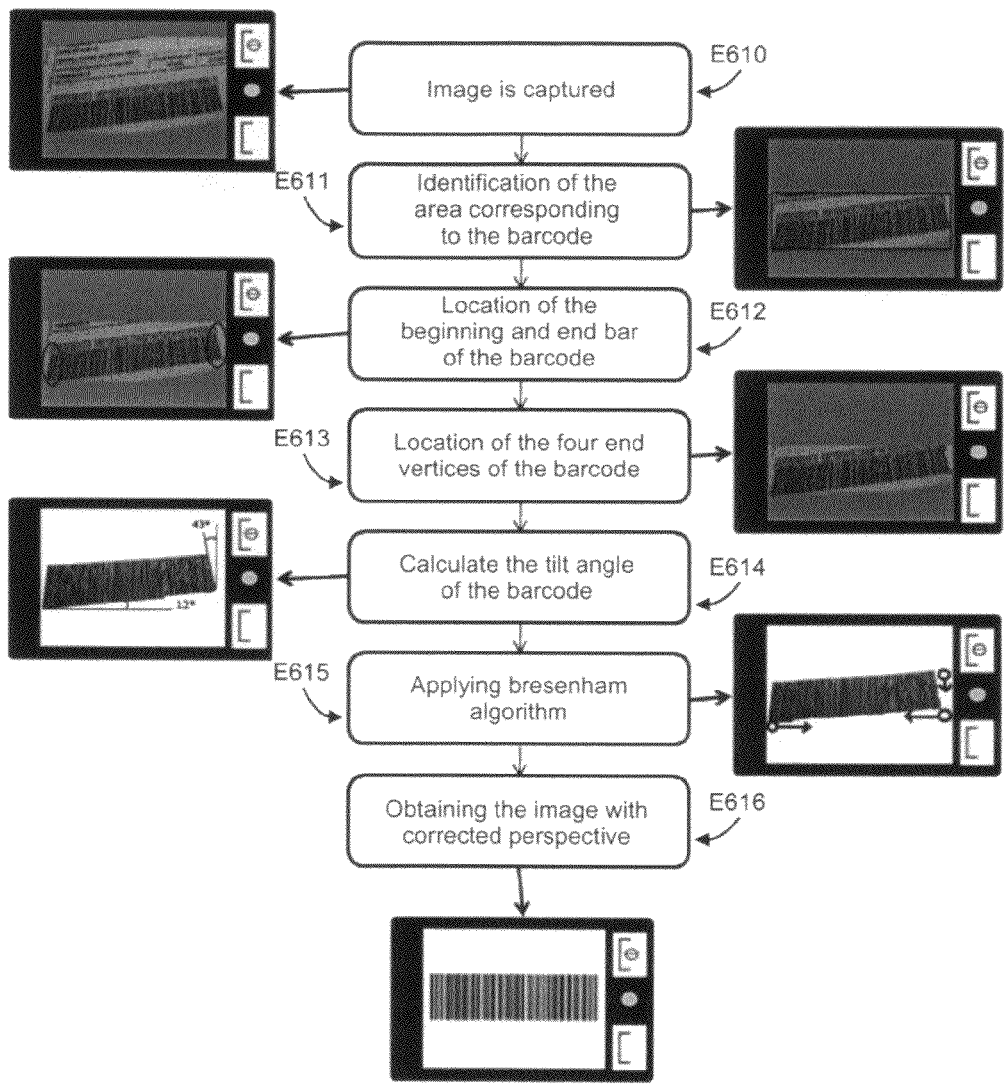
FIG. 6 details how the algorithm works on perspective correction.

This introduces usability to the system and confirms the robustness of reading the barcode. The system described herein corrects problems in perspective related to the slope of the image and/or device before decoding is done. Thus, the usability of the application is enhanced, since it allows that photographs are taken at angles of up to 43°, with respect to the vertical orientation of the barcode, and rotation of 12° from the horizontal, as shown in FIG. 6, without implying negatively in the decoding process. The process of perspective correction also corrects shear and rotation, since it turns the image contained in an arbitrary quadrilateral into a rectangle containing the barcode.

Automatic Capture:

One of the features implemented by this invention is the automatic capture of the barcode. The automatic capture is performed as soon as the barcode of a particular pattern is identified, without requiring the user to press any key. It is just necessary to point the device and follow the help text to position the device properly. Once positioned properly, the automatic capture is done and if the result is positive, it is displayed and stored on a clipboard.

Automatic Adaptation to Ambient Lighting

To increase the percentage of accuracy, the present invention implements self-adjustments in the decoding process in order to adjust the lighting of the environment in which the image is captured. Lighting is an essential factor for identifying the presence of a barcode. To identify the presence of a barcode, the rate of change of colors in the image converted to grayscale is checked. To distinguish dark colors from the clear ones, a threshold value is defined. The binarization threshold for black and white, the amount of horizontal sections in which the image is divided and the amount of vertical sections in which the horizontal sections are divided are variable, self-adjusted until the end of the decoding process. It is by means of the adjustment of these three parameters that the present invention is suitable for various lighting scenarios. The binarization threshold for black and white is adjusted automatically to obtain a valid sequence of barcode for each digit and the complete sequence.

Confirmation of the Final Result Through the Check Digit

Before displaying the decoded value, it is validated by calculating the general check digit. This check ensures the liability of values and thus implies in a positive liability of the application. If this check fails, a new photograph must be taken.

Correction of Image Noise

Before attempting to decode the image, the present invention performs perspective correction followed by correction of noise in the image. Noise reduction is to vertically scroll the image, pixel by pixel, with the stacking method in order to improve the signal to noise ratio. Using this method, it is checked vertical adjacency of each pixel and quantification of the impact of each color. The color of reduced incidence is identified as noise and is overlapped by the color of greater incidence. Thus, the percentage of accuracy is increased, ensuring the robustness of the decoding process.

Horizontal Cuts in the Image

To maximize the percentage of accuracy in the decoding process, the present invention makes cuts horizontally across the image of the barcode. These horizontal cuts are analyzed in parallel and their results are validated independently and then compared. These cuts restrict the area examined by the decoding process. These constraints favor the perspective correction, corroborate with the noise fault correction in the image section, enable redundant checks and significantly increases the percentage of accuracy since a result is generated for each horizontal section of the analyzed image.

Vertical Cuts in the Image

In addition to horizontal cuts, the present invention also makes vertical cuts in each horizontal section of the image thereby generating a matrix of sections. Analyses are performed on all sections independently. Through the vertical sectioning, it is possible to detect and correct problems related to partial shade and/or bright light.

Shading Correction and Bright Light

Shadows and light negatively impact on the decoding process. To reduce these problems, the present invention sections the image and performs independent analysis in all sections. The binarization is applied to each section individually, and thus the accuracy in the calculation of thresholds is increased, since they are calculated for each section of the image.

The invention has as a preferred embodiment an integrated software and hardware based on a portable device, and thus making the practical implementation of an efficient and effective method for decoding barcode. The system allows its user to decode barcodes using a portable device quickly and easily, adding value to the portable device and facilitating, for example, the payment transactions based on barcode, with consequent importance on applicability aspects and commercial value either as an immediate product or as an integrated solution to a larger system.

For the part of the process implemented in software, it begins with the placement of the portable device by the user on a document containing a barcode, this positioning being oriented by the portable device via messages to the user. The photo of the barcode can be performed manually or with automatic detection of the barcode. The image obtained is then processed in the portable device in order to address issues of lighting, perspective, rotation, signal to noise ratio, among others. Multiples decoding processes are performed in several different cuts of the barcode for a cross validation procedure to increase the robustness of the process. Finally, it is presented to the user with a number corresponding to the decoded barcode or a message asking to take a new photo.

With regard to the hardware, as illustrated in FIG. 1, the portable device may be composed of the central processing unit or other processing element 111 to execute computer instructions 112 with the integrated camera, for storing information and instructions 113, exhibition means 114, information input device 115, audio input and output component 116, such as microphone and speaker, and connectivity component to other computer devices via wired or wireless network 117. To run the system described in this invention, the device in question must have camera with auto-focus or take pictures with enough focus to clearly distinguish between the bars.

Figure 3:
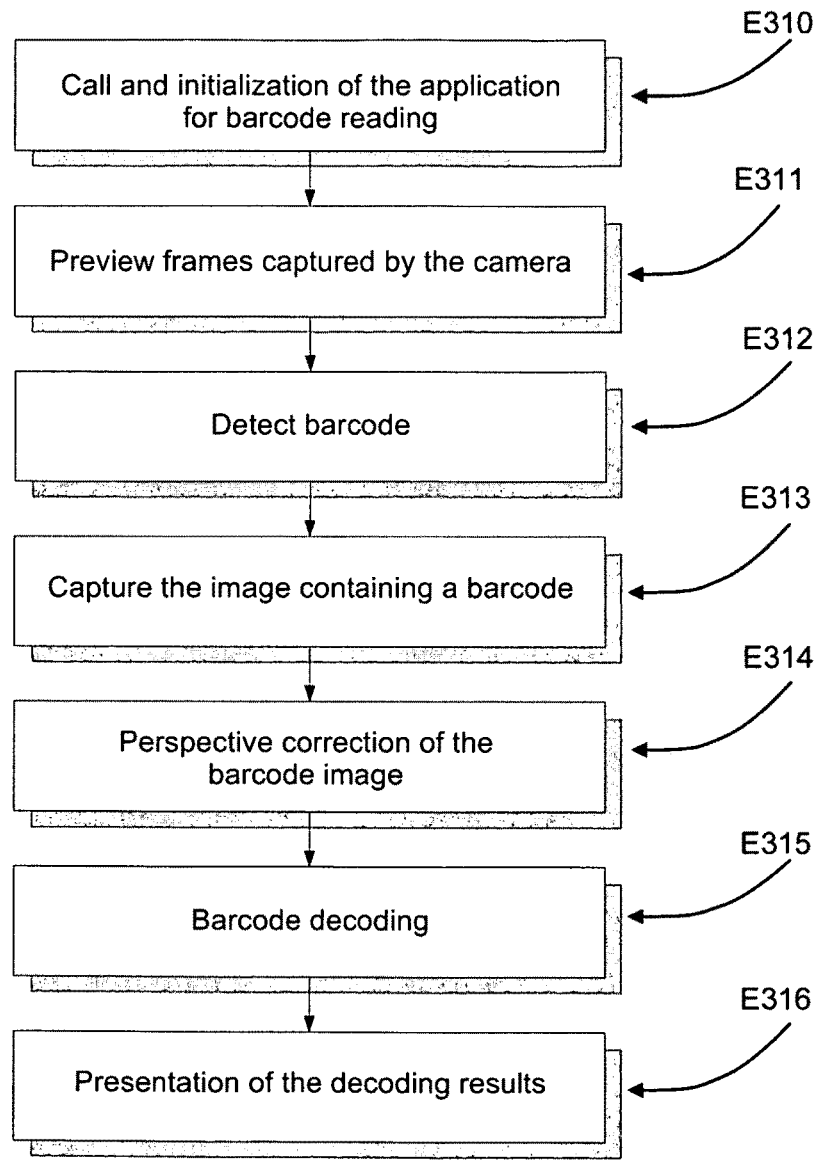
FIG. 3 is a block diagram of the method for recognition of barcodes.
Figure 4:
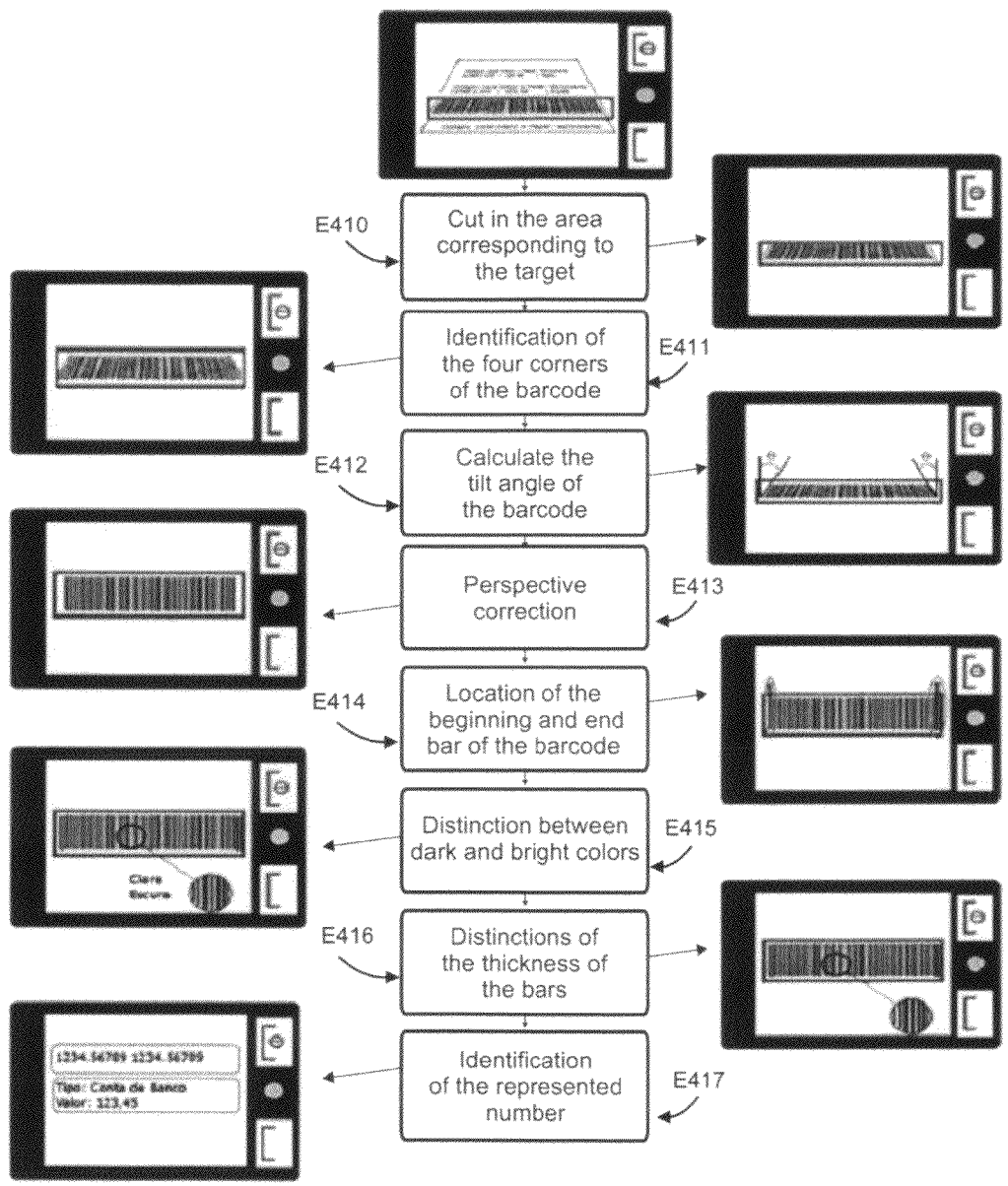
FIG. 4 shows an overview of image processing and computer vision using the method proposed by this invention.
Figure 5:
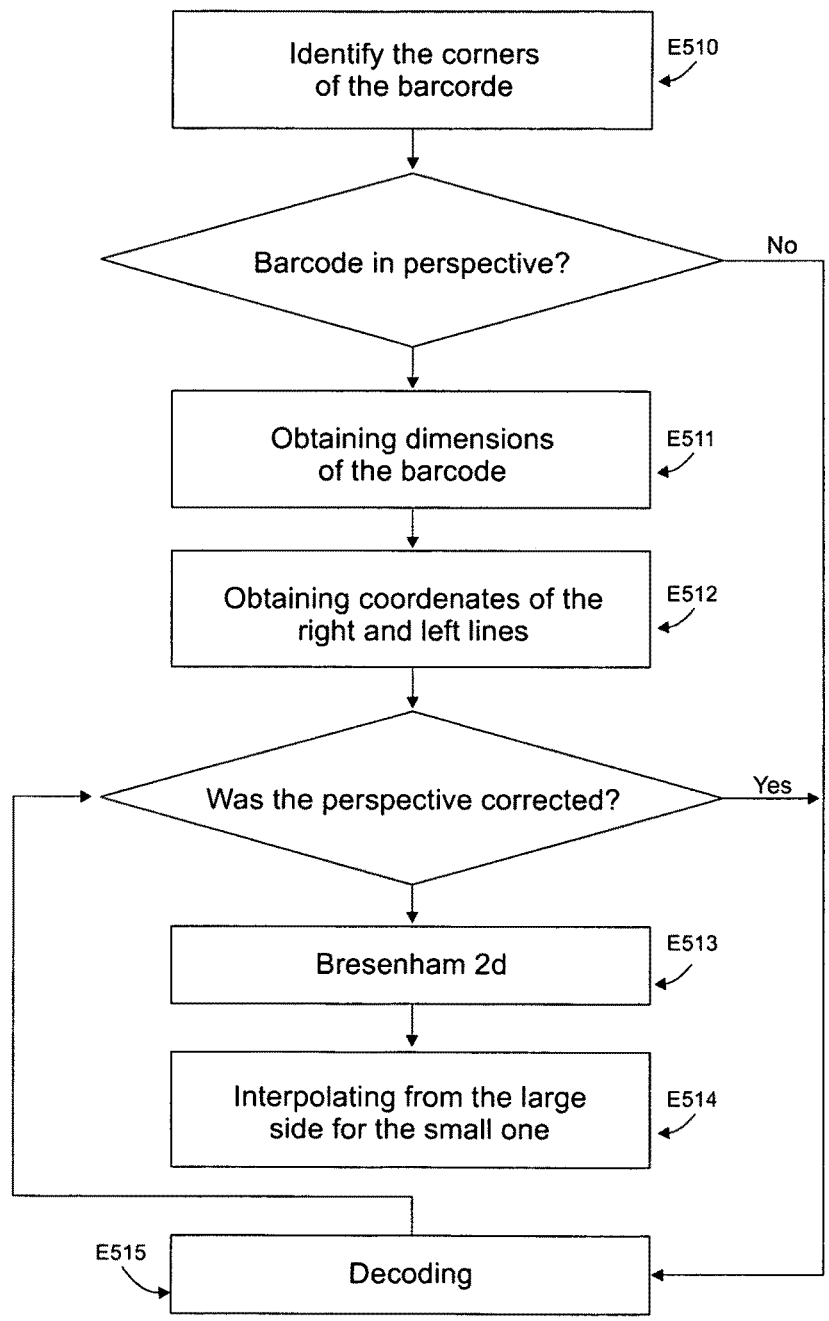
FIG. 5 shows an overview of the perspective correction algorithm.

In FIG. 3, it is shown an overview of the method in a block diagram with the respective processing steps. These steps are detailed below in order to provide enough details on the process. FIG. 4 details the specific steps of image processing and computer vision used to decode barcodes according to the present invention. FIGS. 5 and 6 specifically detail the step of perspective correcting of the image of the captured barcode.

In the step "call and start the implementation of barcode reading" (310)", the initial procedures for implementing the system on the portable device are performed, such as preparing and displaying the user interface, initial configuration of the hardware of the portable device and start-up of the embedded software.

In the step "Preview of the frames captured by the camera" (311), images of camera previewing are shown on the portable device. The system does not process all the frames coming from the preview. The sampling frames are selected, from ranges to ranges, and are then processed. At each n frames, one is captured by the application to be verified, a cut only the area corresponding to the target is made. This area of the cropped image is converted into grayscale. This jump of n frames is performed not to cause delays in the camera's preview. Otherwise, due to the processing of these frames, delays occur, and the viewing becomes low and "broken" (skipping frames).

In the step "Detection of barcode (312), there are provided functions of detecting cuts of the framed image with the target on the screen of the portable device and promising image preprocessing and detection barcodes. This step is sub-divided into the steps detailed below:

A) Cut the Region Corresponding to the Target Barcode:

The application does not check the frames completely, before checking, a cut is made in the image. This cut corresponds to the area indicated by the target and is a factor that reduces the processing time (since the only promising part of the image is processed, and the rest of the image is not considered), avoiding delay when viewing in preview mode.

The cut of the target is accomplished through the proportional computing on the analyzed frame, with reference to the dimensions of the frame and the dimensions of a barcode of the Interleaved 2 of 5 Standard. The size of the cut is defined by calculating the following:

X=standard height of the barcode.
Y=frame height
Z=width of the device screen in pixels.
cut height=X*Y/Z. (A)
cut width=frame width (2)

Through this calculation, only the area corresponding to the target is processed, ignoring thus the rest of the image, which increases efficiency in processing.

Conversion of the Cut Image into Grayscale

Depending on the type of portable device on which the application is being developed, it will be necessary to transform the native format of your image preview, either YUV, RGB, YCbCr, among others, to the format of grayscale. This format uses as input to the algorithm for the identification barcode. So a conversion of cropped image into grayscale is carried out, since the decryption algorithm expects this color pattern. If the image format returned by the preview is YUV, image conversion into grayscale is performed by capturing the Y channel which is the channel that stores the grayscale image. If the method of the image compression used in the current device does not provide an explicit and direct correlation with grayscale, the cropped image is first converted into bitmap format. After this stage, it is converted into grayscale, using a proportional calculation that modifies the channels values, converting thus the image of the cut into grayscale.

Analysis of Cut to Identify Whether it is a Possible Barcode by Analyzing the Rate of Change of Intensity in Horizontal and Vertical Sides and Center From the stream of frames, the analysis is done in order to identify if the picture is promising, or if it is highly likely that the image is a barcode. To avoid a large processing of frames that cannot be decoded, there is provided by means of studying the rate of change of color intensity in the horizontal, a filtering of frames that do not have the basic characteristics of a barcode, as it is the case of which has sight color variation in the horizontal direction in the center of the image. In the filtering process, the image is divided into five parts, margins (left and right), sides (left and right) and center. To assess whether that image is a promising barcode, it is calculated color variation for each of the fields and checked if there is a minimum amount of variation in the center, if the margins exceeded a threshold of change and if the sides had a variation within a range of percentage of center variation, no much more nor much less.

In the step "Capture image containing a barcode (E313), there is provided condition checks on the leveling the portable device, the photo automatically captured, if the user has been previously selected this option, the resolution of the cut may be optionally reduced to increase the processing efficiency and the rate of change of the image checked in order to identify the framework of the barcode. This step is sub-divided into the steps detailed below:

Check if the Portable Device is in Line with the Document and if the User is Holding the Portable Device without Trembling, if the Portable Device has an Accelerometer If the device has some mechanism to provide, directly or indirectly, information about the stability of the device, the system benefits from this type of resource to increase the accuracy of the positioning device at the time of the image capture. Using the accelerometer, for example, you can check if the device is properly aligned or if it was improperly moved. Thus, it is possible to handle cases of improper moving of the device at the time the image is captured by favoring usability and increasing the margin of success of the system.

If the Framed Cut in the Target Image is Identified as a Possible Barcode and the Device is Firm and Leveled, a Picture is Captured Automatically The system processes, at each n frames, the image area corresponding to the target in order to verify the presence or not of a barcode. If the processed image can be a barcode, the system performs the automatic triggering of the photo, if the automatic capture is enabled.

However, in some cases, the captured image may suffer some interference, if the device is improperly handled just before the capture is made. With the help of motion and level sensors in the devices of the preferred embodiment of the invention, it is possible to prevent images from being captured if the portable device is moved just before the image is captured, thus avoiding that blurred images are captured. The use of resources that provide information about level and movement increase the accuracy of the application relating to image capture.

The Image Resolution of the Cut can be Reduced to Decrease the Processing Time so as not to Interfere in the Efficacy of Barcode Decoding Reducing the image resolution of the cut increases the efficiency of processing. It is important to mention that this reduction should be effected so that the resulting resolution did not interfere with the accuracy of decoding, because the images with very low resolution may exceed the limit for discrimination between two adjacent bars.

Using the Sobel Algorithm for Identifying the Number of Lines with Variation Rate Above a Certain Threshold to Verify Whether They Belong to a Barcode and Whether it is Framed in the Target The Sobel operator analyzes the grayscale images and makes use of two masks 3 by 3, one for calculating the horizontal gradient and one for the vertical gradient. A pixel image is fixed, then the neighboring points are examined in all directions and their intensities are obtained. Each element of the operator is then multiplied by the intensity of the pixel corresponding to the position of the matrix.

The results obtained by applying the Sobel operator indicate which is the magnitude and direction of the gradients of the pixels of the image:

$$\begin{bmatrix} 1 & 2 & 1 \\ 0 & 0 & 0 \\ -1 & -2 & -1 \end{bmatrix}_{Gy}$$

$$\begin{bmatrix} 1 & 0 & -1 \\ 2 & 0 & -2 \\ 1 & 0 & -1 \end{bmatrix}_{Gx}$$

The magnitude is then given by:

$$M = \sqrt{Gx^2 + Gy^2} \quad (4)$$

The gradient direction is given by:

$$\theta = \tan^{-1}\left(\frac{Gy}{Gx}\right) \quad (5)$$

With this horizontal and vertical image check, you can indicate the variation rate in these two directions. In case of barcodes, the vertical variation is low and the horizontal is high.

In the step "Correction of perspective image of the barcode" (E314), there is provided the perspective, shear and rotation correction of the image captured by the portable device in an efficient and effective manner, as shown in FIGS. 5 and 6. This step is sub-divided into the steps detailed below:

Identification of the quadrilateral containing the barcode, and the first and last bars are covered in order to identify the end vertices of the quadrilateral containing the barcode This step is performed to search the four corners of the barcode in the image, which begins with a simple scan at half the height of the image to find the first point of quantized color as black. From that point on, there is a recursive search through the black adjacent points in the directions (up/down, left/right) of each corner of the image. Thus, we define the bars that limit the lateral barcode, allowing the determination of the quadrilateral containing the barcode.

If the slope of the sides of the quadrilateral containing the barcode is above a certain threshold, then it is applied the perspective correction. The determination of the quadrilateral containing the barcode has great relevance, since it allows to identify the angles of deflection caused by the perspective effect due to the positioning of the camera over the barcode.

Perspective correction maps an image contained in an arbitrary quadrilateral that now has the shape of a rectangle. According to the preferred embodiment of the invention, an efficient algorithm is used for perspective correction based on scan lines using the Bresenham algorithm.

Each scan line of the quadrilateral has its pixels mapped into a scan line in the rectangle desired. Therefore, performance is optimized in real-time algorithm for mobile devices. The perspective correction is done by interpolating of the lines from higher to lower side, obtained by the Bresenham algorithm, in a way that the corrected image will always stay with the smallest dimensions (width and height) that exist in the image with perspective. The perspective correction is important to increase the efficiency of the decoding process.

At the step "barcode decoding" (E315), the decoding is performed and cross-validation of the barcode obtained from the image captured by the portable device in an efficient and effective manner. This step is sub-divided into the steps detailed below:

The image of the cut is divided into horizontal slices of the barcode that should contain the same barcode, so that the robustness in the decoding process is enhanced by the decoding of each of the slices The original image of the barcode is received by the decoder in grayscale, and from a parameter, there is defined slices of this image. Each slice is processed and decoded separately until it reaches the end of the image (last slice). At this moment, there is a combination of results in an intermediate result. This result may still contain digits that were not possible to be decoded.

Slicing the image helps the chance of final decoding, as it combines the sharper parts of each horizontal slice of the image. It is possible to occur noises that can damage only one piece of a horizontal slice or an entire horizontal slice. This sub-step can be subdivided further into:

Stacking of the Image by Adding the Intensities in the Vertical Direction

Given an image (or a piece of the same), the average color of each column of pixels in grayscale will be computed, resulting in an array, in which each position is the result of the average of the corresponding column. This is necessary so that reduction of vertical noise of the image is obtained, provided that for decoding the barcode, it is important to have information on width and on color of the bars, and this process has resulted in enhancing the color of a column of pixels, or color of a bar.

Binarization of the Image Based on Adaptive Quantization Threshold

This threshold is determined from a search around the average intensities of the image to ensure that the identified sequence of bars is valid. During the processing of a vertical piece, it is calculated the threshold of the color cut for black and white in this piece. The threshold is a specific calculation of the average color of the piece. After this step, with the threshold already obtained, the corresponding piece is used in the vector on the stacked image, we define which pixel is black pixel and which one is white (less than or greater than the threshold cutoff, respectively). Upon completion of processing of all the vertical pieces, we obtain a resulting binary vector in which "1" represents a black pixel and "0" represents a white pixel.

Identification of Light and Dark Regions of the Barcode

The identification of light and dark regions occurs with binary normalization, in which the value 1 (one) represents dark pixels and the value 0 (zero) represents the light pixels of the image. From a color threshold calculated using the average of the colors in grayscale of the image, it is analyzed for each pixel whether it is smaller or larger than the actual value of the threshold, thus meaning that a pixel is black or white, respectively.

Counting of the Number of Consecutive Pixels of Light and Dark Regions

The counting of the numbers of consecutive pixels of the same sort of color (light or dark areas) aims to provide the values of the widths of black and white bars of the image. From the data with the information of the black and white value of the image, accounting of sequences of colors is made, which defines the size of the width of the bars. An example is the sequence '000001110001111100', where the value 0 indicates white and the value 1 indicates black. Thus, this example determines the width of the bars, respectively, in the white bar with 4 units, black bar with 3 units, white bar with three units, black bar with 5 units and a white bar with two units.

Identification of Narrow Bars and Wide Through the Threshold Based on Average Width of the Bars This step aims to define the cutoff value for the width of the bars. From an array of elements containing the information of measure of the width of the white and black bars of a sample barcode, the function takes the average between the highest and lowest value of this array. The number obtained is the cutoff width of the bars. From an array with information of measure of the width of the white and black bars of a sample barcode, and also with the cutoff value of barcode width ("width threshold") in each position of the array, it is checked if the value is greater or less than the threshold width. If lower, the bar is given as narrow. Otherwise, it is given as wide.

Validation of the Initial Fixed Sequence Initiation of the Barcode

This step aims to find the beginning (first pixel) of the block "start" of the barcode. To search for the block of "start", first, it is defined the width of the bars in an amount related to the block size of "start" (eg. In the interleaved 2 of 5 standard it is 4 bars), in this group of bars, it is defined which is narrow or broad using a width threshold, bars with smaller width than the threshold are narrow (value 0), the ones with larger widths are broad (value 1). After these two processes, the information is translated into binary information to set up the sequence with respect to the "start" state (on 2 of 5 standard are four narrow bars "0000"). The process continues until the "start" block is found. When the block is found, it returns to the position of the first pixel of the block. If the block is not found, a fault is returned.

Identification and Validation of the Pairs of Digits by the Bar Sequence

After the process of defining broad and narrow bar, it is made to count the number of bars found in the vertical piece in question. This value is compared with the amount of bars defined by the standard in use (in the case of the interspersed 2 of 5 barcode with 227 bars). If the amount is equal, the binary information on width of the bars is translated into numerical digits via a standard dictionary present in this code. Thus, it has been the result of decoding a horizontal slice, which can contain digits not decoded. This intermediate result is stored temporarily until the last slice to be processed and occur the merge with results of all horizontal slices. In summary, one gets a binary vector containing information on the widths of the bars (1 wide, 0 narrow) and translates this vector into a numerical sequence that is encoded in the barcode.

Internally, in the translation step, it is processed a block interleaved by another block of bars that will be processed in sequence. Therefore, they are always translated into pairs of digits. First, it is translated into a block of black bars. Then, the block interspersed with white bars. At this point of the decoding of a horizontal slice, only information on width of the bars are stored. At this step, there is more color information explicitly, but indirectly it is known that the first bar (position) of the width vector is black and the next is white and so on. This is due to the characteristics of the problem and the organization of structures along the decoding process.

Cross Validation of the Six Decoded Slices

If the majority of the decoded barcode is identical, it is considered that the barcode is valid. As soon as the last horizontal slice is decoded and it reaches the end of the image, the results of the stored horizontal slices are used in a function that combines these results and generates a single result, provided that it is still an intermediate result. After this, the amount of non-decoded digits from this result is counted and if the percentage of them is less than 40%, this intermediate result is stored in a result set of configuration parameters that are received at the start of an iteration of adaptive decoding. This process of decoding and storing the results of each choice of parameters is done by the end of the list of parameters or with at least five results stored satisfactory result is met (no errors). At each choice of different parameters within this adaptive algorithm, we have only one result generated by combining the results of decoding of each slice horizontally, using the parameters defined at the beginning of the interaction. Each of these single results, after a filter that defines good results with number of digits decoded, is stored to be used at a final combination. This final combination takes place upon generation of five new partial results, with a cumulative combination, since the previously stored partial results also take part in this merger.

The merging of partial results generates a unique outcome that is evaluated and if it has all the decoded digits, it will be the final number sequence corresponding to the decoding of the barcode. If this end result contains digits of blocks that could not be decoded, the interaction returns to the beginning to the choice of new parameters to adjust the threshold value for color and amount of vertical cuts. Therefore, these interactions will continue until finishing the configuration parameters or a complete end result is generated. Occurring the first case, a final blend is made with all the partial results stored. If it is not generated a complete result in this last attempt, the end result will not decode this image of the barcode.

In the step "Presenting the results of decoding" (E316), the conversion and the presentation of the number obtained from the decoding of the barcode are made. The presentation of results to the user displays the decoded code, if it is valid. Otherwise, the portable device prompts the user to capture another picture. The results can also be transmitted from one device to other devices. Right after the decoding, the integer vector is converted and organized into a string (string), following the patterns of line specified by the Brazilian Federation of Banks (FEBRABAN) and National Center for the Study of Bank Collection (CENEABAN). During this formatting, check digits of the fields are generated, as well as it made the authentication of the sequence of digits via general digit check of the barcode. After this process, the obtained results are presented, if they are valid, by means of a screen, which displays the account type, amount payable and the number represented in the barcode. The decoded code displayed on the screen may also serve as input to another application if the OK button is pressed and the cursor is positioned in a text box. Thus, it is possible to integrate the system with other applications that have entries for text, in particular the pages of online banks.

The present invention has been described and it will be obvious to a person skilled in the art that many changes and modifications can be made to the same, without departing from the spirit or the scope of this invention as defined in the appended claims.

What is claimed is:

1. An automatic method for capturing, reading, and decoding barcode images for a portable device having a digital camera, the method comprising:
   initializing a reading of a barcode, wherein the initializing comprises executing initial procedures for preparing and displaying a user interface, configuration of hardware of the portable device, and start-up of embedded software;
   previewing frames captured by the camera, which are displayed in a preview image display on the camera of the portable device;
   detecting the barcode, wherein the detecting comprises detecting an area of the framed image to crop with a target on the screen of the portable device, and pre-processing the image;
   capturing an image containing the barcode, wherein the capturing comprises checking a level of the portable device, capturing the image, and finding a variation rate of the image to identify the framing of the barcode on the target;
   perspective correcting the image of the barcode, wherein the correcting comprises correcting perspective, shear, and rotation of the image;
   decoding the barcode, wherein the decoding comprises dividing the image into horizontal slices that should contain the same barcode, and cross-validating and decoding the barcode obtained from the image; and
   presenting the results of decoding, wherein the presenting comprises converting and presenting the number obtained from the decoding of the barcode.

2. The automatic method according to claim 1, wherein a portion of the previewed frames captured by the camera are not processed for barcode detection.

3. The automatic method according to claim 2, wherein one of every n frames is captured by the application to be verified, and the area corresponding to the target is cropped.

4. The automatic method according to claim 3, wherein the cropped area of the image is converted to grayscale.

5. The automatic method according to claim 3, wherein one of every n frames is captured to minimize delays in the preview of the camera.

6. The automatic method according to claim 1, wherein in the previewing the frames captured on camera, sampling frames are selected, from ranges to ranges, and are processed.

7. The automatic method according to claim 1, wherein detecting the barcode comprises:
   cropping the target region corresponding to the barcode,
   converting the image of the cropped region to grayscale, and
   analyzing the cropped region to identify whether it is a possible barcode by analyzing the variation rate of intensity in horizontal and vertical in sides and center of the cropped region.

8. The automatic method according to claim 7, wherein the cropped region of the target corresponding to the barcode is obtained by proportional computing on the analyzed frame, with reference to the dimensions of the frame and the dimensions of a barcode of the Interleaved 2 of 5 Standard, the size of the cropped region is defined by calculating the following:
   X=standard height of the barcode, Y=frame height, Z=width of the device screen in pixels.

9. The automatic method according to claim 7, wherein from the stream of frames, an analysis is made in order to identify whether the image is a barcode, and a filtering of frames that do not have the basic characteristics of a barcode is made from the study of the variation rate of color intensity in the horizontal.

10. The automatic method according to claim 7, wherein only the area corresponding to the target is processed, ignoring the rest of the image.

11. The automatic method according to claim 10, wherein during filtering the image is divided into five parts, comprising margins (left and right), sides (left and right), and center.

12. The automatic method according to claim 10, wherein in order to assess whether the image is a possible barcode, it is calculated from the color variation for each of the areas and checked if there is a minimum amount of variation in center, if the margins did not exceed a threshold of variation and if the sides had a variation within a range of percentage of variation of center.

13. The automatic method according to claim 1, wherein in the capturing an image containing barcode, the image is captured automatically, if the user has previously selected this option.

14. The automatic method according to claim 1, wherein in the capturing an image containing a barcode, the image is optionally reduced to the resolution of the cropped image to increase processing efficiency.

15. The automatic method according to claim 1, wherein the capturing an image containing a barcode further comprises:
- verifying that the portable device is in line with the document and whether the user is holding the portable device without trembling,
- if the cut of the framed image in the target is identified as a possible barcode and the device is firm and leveled, a picture is taken,
- reducing the image resolution of the cut to reduce processing time, and
- using the Sobel algorithm for identifying the number of lines with variation rate above a certain threshold to verify whether they belong to a barcode and whether it is framed in the target.

16. The automatic method according to claim 15, wherein the perspective correcting maps an image contained in an arbitrary quadrilateral to take the shape of a rectangle, with each scan line of the quadrilateral having its pixels mapped into a scan line on the desired rectangle.

17. The automatic method according to claim 1, wherein the perspective correcting the barcode image includes identifying a quadrilateral containing the barcode, and covering the first and last bars in order to identify the end vertices of the quadrilateral containing the barcode.

18. The automatic method according to claim 17, wherein in the identifying the quadrilateral containing the barcode, performing a search is performed for the four corners of the barcode in the image, which starts with a simple scan half the height of the image to find the first point of quantized color as black, and from that point, there is a recursive search through the black points in adjacent directions (up/down, left/right) of each corner of the image, defining, therefore, the lateral bars that limit the barcode and determining the possible quadrilateral that contains the barcode.

19. The automatic method according to claim 17, wherein in the identifying the quadrilateral containing the barcode, if the slope of the sides of the quadrilateral containing the barcode is above a certain threshold then perspective correction is applied.

20. The automatic method according to claim 17, wherein the perspective correcting is implemented by interpolating the lines from higher to lower side, obtained by the Bresenham algorithm, in a way that the corrected image always will have the smallest dimensions (width and height) that exist in the perspective image.

21. The automatic method according to claim 1, wherein the dividing the image comprises:
- stacking the image by adding the intensities in the vertical direction,
- binarizating the image based on adaptive quantization threshold,
- identifying light and dark regions of the barcode,
- counting the number of consecutive pixels of light and dark regions,
- identifying narrow bars and wide bars through the threshold based on average width of the bars,
- validating fixed sequence of beginning of the barcode, and
- identifying and validating the pairs of digits of a sequence of bars.

* * * * *